Feb. 14, 1950     G. H. MILLER     2,497,182

POWER SUPPLY

Filed Jan. 23, 1948

*INVENTOR.*
GLENN H. MILLER
BY *T. L. Bowes*
ATTORNEY

Patented Feb. 14, 1950

2,497,182

UNITED STATES PATENT OFFICE 2,497,182

POWER SUPPLY

Glenn H. Miller, Ames, Iowa, assignor to Stromberg-Carlson Company, a corporation of New York Application January 23, 1948, Serial No. 3,872

8 Claims. (Cl. 321—2)

This invention relates to a high voltage power supply and more particularly to a high voltage power supply of low power capacity.

It has been proposed heretofore to utilize a pulse generator or oscillator as a source of high voltage direct current. In such arrangements, the pulsed oscillator output is rectified and filtered as by means of an R-C filter, the filtered output voltage depending upon the average charge carried by the filter capacitors. Such systems are sensitive to relatively slight changes in load.

It is an object of this invention to provide a new and improved high voltage power supply which is simple, inexpensive, comprises relatively few parts and which maintains substantially constant output voltage with changes in load.

In systems of the type described above, the charge on the filter capacitors, and hence the output voltage of such power supply systems, is directly proportional to the repetition rate of the pulse generator. According to my invention, there is provided means utilizing a portion of the rectified and filtered output of the pulse generator or oscillator, i. e., means responsive to changes of a characteristic, such as an amplitude of voltage, for varying the repetition rate of the oscillator in a sense to correct for changes in voltage, for example, in order that substantially constant output is maintained. For example, a part of the output voltage may be impressed upon a suitably arranged amplifier or inverter and the output thereof utilized to modify the control electrode potential of an electron discharge device or devices employed in the oscillator or pulse generator. By this means, a change in the average value of the rectified and filtered voltage establishes a control voltage which may be applied to the generator in such a manner as to adjust or vary the repetition rate sufficiently to return the output voltage to the desired value.

Further objects and advantages of my invention will become apparent as the following description proceeds, and the features of novelty which characterize my invention will be pointed out with particularity in the claims annexed to and forming a part of this specification.

Figure 1:
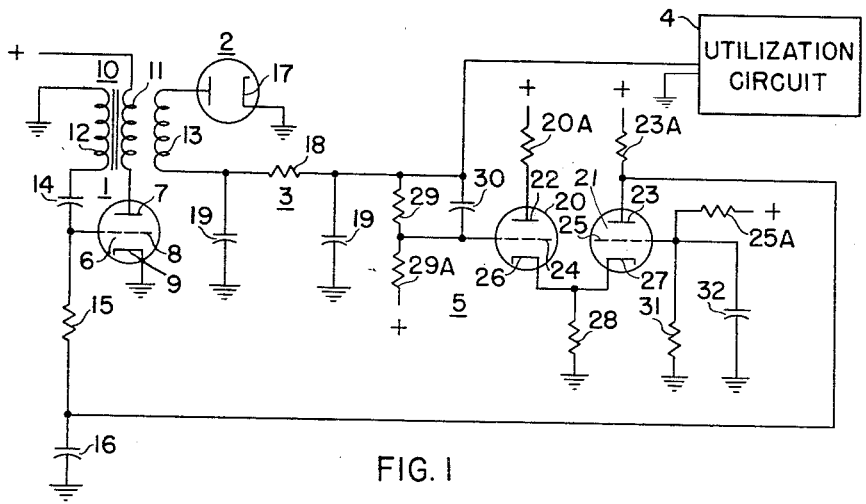
Figure 2:
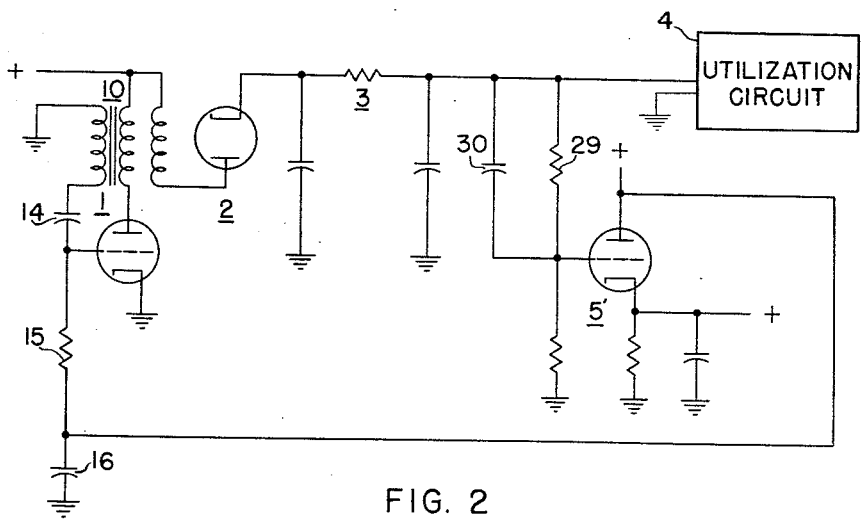

For a better understanding of my invention, reference may be had to the accompanying drawings in which Fig. 1 is a schematic diagram illustrating one embodiment of the principles of my invention, and Fig. 2 illustrates a second embodiment.

Referring to Fig. 1, there is illustrated an embodiment of my invention adapted for use with a source of negative output voltage. There is shown a source of pulses 1 which in the illustrated embodiment of my invention is a transformer coupled blocking oscillator. The output of the oscillator 1 is rectified by means of a suitable rectifier 2 and filtered by means of a suitable filtering circuit 3. The output voltage of the power supply thus provided may be impressed upon a suitable utilization circuit 4. In case the load, identified as the utilization circuit 4, increases tending to pull down the actual amplitude of the output voltage, there is provided a suitable amplifier 5 arranged to provide a control voltage whose amplitude depends upon the amplitude of the output voltage and whose sense depends upon the sense or polarity of the power supply voltage. The control voltage is applied to the control electrode circuit of the oscillator 1.

The blocking oscillator comprises an electron discharge device 6 including an anode 7, a control electrode 8 and a cathode 9. There is also provided a three-winding transformer 10 including windings 11, 12 and 13.

Cathode 9 of electron discharge device 6 is connected to ground. Anode 7 is connected to a suitable source of positive potential through transformer winding 11. The control electrode 8 is connected to one end of transformer winding 12 through a suitable capacitor 14, the other side of winding 12 being grounded. Control electrode 8 is also connected to ground through a suitable resistor 15 and a suitable capacitor 16.

If it be assumed that capacitor 14 is negatively charged by the preceding cycle, discharge device 6 is biased well below cut-off. As the charge on capacitor 14 leaks off, the potential increases until finally discharge device 6 is rendered conducting. As a result of conduction through the discharge device 6 and current flow through transformer winding 11, a magnetic field is set up around winding 11. This field causes the induction of a voltage in transformer winding 12. Since the field around winding 11 builds up from zero to maximum in direct proportion to the anode current of discharge device 6, the voltage induced in winding 12 is also in proportion to the anode current. The induced voltage is impressed on control electrode 8 and, if the windings are properly connected, through capacitor 14, control electrode 8 is driven more and more positive as the field around transformer winding 11 builds up. When the anode current reaches saturation value, the field about winding 11 ceases to increase and because there is supplied no further charging potential, capacitor 14 begins to discharge. As a result the potential at control electrode 8 becomes less, the amount of anode current becomes less, and there then begins a collapse of the field around winding 11. The collapsing field induces a voltage in winding 12 in the opposite direction to the first-described voltage and this newly induced voltage drives the control electrode 8 in the negative direction beyond cut-off, thereby completing one cycle of operation. From the foregoing description, it is apparent that potential applied to the control electrode modifies the period of operation of device 6 and hence the repetition rate.

As indicated heretofore, there is provided a suitable rectifier 2 in the output of transformer 10. In the illustrated embodiment of my present invention I have illustrated the use of a diode 17 connected between one end of transformer winding 13 and ground.

The previously mentioned filter 3 is connected between the other end of winding 13 and ground and comprises in the present embodiment of my invention a resistor 18 and two capacitors 19 connected between opposite ends of resistor 18 and ground. The utilization circuit represented by the numeral 4 is connected across the output of the power supply, i. e., across capacitor 19, and the voltage available for use is that appearing across capacitor 19. The voltage appearing across capacitor 19 is directly proportional to the repetition rate of oscillator 1.

If the amount of current drawn by the load or utilization circuit 4 is increased, there may result a decrease in the output voltage of the power supply comprising the oscillator 1, the rectifier 2 and the filter 3. In order to obtain a control voltage for modifying the repetition rate of oscillator 1 to correct for the lowered output voltage, there is provided an amplifier 5.

In the embodiment of my invention shown in Fig. 1 there is shown an amplifier employing electron discharge devices 20 and 21 having anodes 22 and 23, control electrodes 24 and 25, and cathodes 26 and 27, respectively. The cathodes are connected together and then grounded through a suitable resistance 28. A predetermined amount of the voltage appearing across capacitor 19 is impressed upon control electrode 24 by means of a potential divider comprising suitable resistors 29 and 29a connected in series between capacitor 19 and a suitable source of positive potential. Resistor 29 is shunted by a suitable capacitor 30. Capacitor 30 serves as a short circuit on resistor 29 for rapid changes of potential. Anodes 22 and 23 are connected to a suitable source of positive potential through suitable resistances 20a and 23a, respectively. Control electrode 25 is connected to a suitable source of positive potential through a resistor 25a and also to ground through a suitable resistor 31 and a suitable capacitor 32 connected in shunt. Resistors 25a and 31 provide a potential divider from which grid bias for electrode 25 is obtained. Capacitor 32 has sufficient capacitance to keep control electrode 25 at the potential determined by the potential divider.

The anode 23 of discharge device 21 is also connected to the control electrode circuit of discharge device 6 of oscillator 1 between resistor 15 and capacitor 16.

In operation, for relatively gradual changes of output voltage, part of the output voltage is impressed upon control electrode 24 (for rapid changes, capacitor 30 applies the full change of voltage to control electrode 24). The bias of discharge device 21 varies according to conduction through discharge device 20 because of the common cathode resistor 28. Therefore, variations of potential at anode 23 follow variations in potential at control electrode 24.

Thus, if the output voltage decreases in absolute value, so that an increase in repetition rate is required to restore the output voltage to its desired predetermined amplitude, the potential at control electrode 24 increases proportionately in the positive direction because a larger proportion of the total potential appears across resistor 29a, and hence the potential across resistor 28 increases, and the potential at anode 23 increases. Therefore, the potential applied to control electrode 8 of discharge device 6 becomes more positive and the repetition rate of the oscillator is increased. If the voltage variation is in the opposite direction, the correction is in such direction as to lower the repetition rate.

If a positive rather than a negative output voltage is supplied, the circuit of Fig. 1 may be modified as indicated in Fig. 2 where the same numerals represent the same components as those used in connection with Fig. 1. Inversion is required and hence a simplified amplifier is adequate. It is believed unnecessary to describe in any detail the operation of amplifier 5. It is believed sufficient to point out that an increase or decrease in the power supply output voltage results in a decrease or increase of the amplifier output voltage, a corresponding decrease or increase in the control electrode potential at discharge device 6 and, therefore, a corresponding decrease or increase in the repetition rate of oscillator 1.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What I claim is:

1. In combination with a pulsed power supply arranged to operate at a predetermined repetition rate including a pulsed oscillator, means for energizing said oscillator, means for rectifying the output of said oscillator and means for filtering the rectified output of said oscillator, and means responsive to undesired changes in the voltage at the output of said filtering means for varying said repetition rate in a sense to correct for such changes, whereby the value of said voltage is maintained substantially constant.

2. In combination with a pulsed power supply arranged to operate at a predetermined repetition rate including a pulsed oscillator, means for energizing said oscillator, means for rectifying the output of said oscillator and means for filtering the rectified output of said oscillator, and means utilizing a portion of the voltage at the output of said filtering means for varying the repetition rate of said oscillator in accordance with changes in the average filtered output voltage.

3. In combination with a pulsed power supply arranged to operate at a predetermined repetition rate including a pulsed oscillator, means for energizing said oscillator, means for rectifying the output of said oscillator and means for filtering the rectified output of said oscillator, and means responsive to a reduction in the filtered output voltage for increasing the repetition rate of said oscillator in order to restore the filtered output voltage to its desired value.

4. In combination with a pulsed power supply arranged to operate at a predetermined repetition rate including a pulsed oscillator, means for energizing said oscillator, means for rectifying the output of said oscillator and means for filtering the rectified output of said oscillator, and means responsive to an increase in the filtered output voltage for decreasing the repetition rate of said oscillator in order to restore the filtered output voltage to its desired value.

5. In combination with a pulsed power supply arranged to operate at a predetermined repetition rate including a pulsed-oscillator, means for energizing said oscillator, means for rectifying the output of said oscillator and means for filtering the rectified output of said oscillator, amplifying means, means for impressing a portion of the filtered output voltage on said amplifying means, and means utilizing the output of said amplifier for modifying the bias of said oscillator in order to modify the repetition rate of said oscillator in accordance with changes in the average voltage output.

6. In combination with a pulsed power supply arranged to operate at a predetermined repetition rate including a pulsed oscillator having an electron discharge device including a control electrode, the repetition rate of said oscillator depending upon the potential existing at said control electrode, means for energizing said oscillator, means for rectifying the output of said oscillator and means for filtering the rectified output of said oscillator, and means responsive to undesired variations in the amplitude of said filtered voltage for varying the potential at said control electrode in order to vary the repetition rate of said oscillator in a sense to correct for such variations in voltage, whereby the amplitude of such voltage is maintained substantially constant.

7. In combination with a pulsed power supply arranged to operate at a predetermined repetition rate including a pulsed oscillator, means for energizing said oscillator, means for rectifying the output of said oscillator and means for filtering the rectified output of said oscillator, means for developing a control voltage the amplitude and sense of which depends upon the amplitude and sense of any undesired variations of the voltage at the output of said filtering means, said means utilizing said control voltage for adjusting the repetition rate of said oscillator in proper sense to tend to correct for such undesired variations in output voltage.

8. In combination with a pulsed power supply arranged to operate at a predetermined repetition rate including a pulsed oscillator having an electron discharge device including a control electrode, the repetition rate of said oscillator depending upon the potential existing at said control electrode, means for energizing said oscillator, means for rectifying the output of said oscillator and means for filtering the rectified output of said oscillator, means for developing a control voltage the amplitude and sense of which depends upon the amplitude and sense of any undesired variations of the voltage at the output of said filtering means, and means for applying said control voltage to said control electrode for changing the repetition rate of said oscillator in proper sense to tend to correct for such undesired variations in output.

GLENN H. MILLER.

No references cited.